US009634539B2

(12) United States Patent
Deits et al.

(10) Patent No.: US 9,634,539 B2
(45) Date of Patent: Apr. 25, 2017

(54) RADIAL MAGNETIC BEARING FOR MAGNETIC SUPPORT OF A ROTOR

(75) Inventors: Robin Deits, Okemos, MI (US); Matthias Lang, Berlin (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 931 days.

(21) Appl. No.: 13/997,035

(22) PCT Filed: Dec. 13, 2011

(86) PCT No.: PCT/EP2011/072527
§ 371 (c)(1),
(2), (4) Date: Jun. 21, 2013

(87) PCT Pub. No.: WO2012/084590
PCT Pub. Date: Jun. 28, 2012

(65) Prior Publication Data
US 2013/0293051 A1    Nov. 7, 2013

(30) Foreign Application Priority Data

Dec. 23, 2010    (DE) .......................... 10 2010 064 067

(51) Int. Cl.
*H02K 7/09* (2006.01)
*F16C 32/04* (2006.01)
*H02K 3/493* (2006.01)

(52) U.S. Cl.
CPC ............. *H02K 7/09* (2013.01); *F16C 32/048* (2013.01); *F16C 32/0461* (2013.01); *H02K 3/493* (2013.01)

(58) Field of Classification Search
CPC . H02K 3/493; H02K 7/09; H02K 3/48; F16C 32/0461; F16C 32/048
USPC .......................................... 310/90.5, 213–215
See application file for complete search history.

(56) References Cited

U.S. PATENT DOCUMENTS

| 2,201,699 | A |   | 5/1940 | Myers |   |
|---|---|---|---|---|---|
| 3,334,252 | A | * | 8/1967 | Gayral | .................. H02K 3/493 310/214 |
| 3,560,776 | A | * | 2/1971 | Kildishev | .............. H02K 3/487 310/214 |

(Continued)

FOREIGN PATENT DOCUMENTS

| CN | 101886670 A | 11/2010 |
|---|---|---|
| DE | 10062753 A1 | 10/2001 |

(Continued)

*Primary Examiner* — Thanh Lam
(74) *Attorney, Agent, or Firm* — Henry M. Feiereisen LLC.

(57) ABSTRACT

A radial magnetic bearing for magnetic bearing of a rotor has a stator which includes a magnetically conductive stator element, arranged circulating around a rotor. The stator element has recesses running in the axial direction of the stator element in which electrical lines from coils are arranged, wherein magnetic fields can be generated by the coils which hold the rotor suspended in an air gap arranged between the rotor and stator. A softer progression of the components of magnetic flow density in the radial direction is achieved by design measures on the transitions from one magnetic pole to the next magnetic pole, which results in a reduction of the eddy currents induced in the rotor.

3 Claims, 4 Drawing Sheets

(56) References Cited

U.S. PATENT DOCUMENTS

| | | | | |
|---|---|---|---|---|
| 4,761,581 A | * | 8/1988 | Watanabe | H02K 3/493 |
| | | | | 310/214 |
| 5,034,643 A | * | 7/1991 | Trian | H02K 3/345 |
| | | | | 310/215 |
| 5,808,392 A | * | 9/1998 | Sakai | H02K 1/278 |
| | | | | 310/156.07 |
| 7,545,066 B2 | | 6/2009 | Baudelocque | |
| 2004/0150278 A1 | * | 8/2004 | Okada | F16C 32/0444 |
| | | | | 310/90.5 |
| 2010/0187926 A1 | | 7/2010 | Baudelocque | |

FOREIGN PATENT DOCUMENTS

| | | |
|---|---|---|
| DE | 60115972 T2 | 9/2006 |
| EP | 0680131 A2 | 11/1995 |
| EP | 0932246 A2 | 7/1999 |
| FR | 2819648 A1 | 7/2002 |
| JP | 58042825 A | 3/1983 |
| JP | 2004132513 A | 4/2004 |
| RU | 2037684 C1 | 6/1995 |

\* cited by examiner

RADIAL MAGNETIC BEARING FOR MAGNETIC SUPPORT OF A ROTOR

CROSS-REFERENCES TO RELATED APPLICATIONS

This application is the U.S. National Stage of International Application No. PCT/EP2011/072527, filed Dec. 13, 2011, which designated the United States and has been published as International Publication No. WO 2012/084590 and which claims the priority of German Patent Application, Serial No. 1020100064067.0, filed Dec. 23, 2010, pursuant to 35 U.S.C. 119(a)-(d).

BACKGROUND OF THE INVENTION

The invention relates to a radial magnetic bearing for magnetic support of a rotor. Radial magnetic bearings are used for magnetically supporting rotors in a radial direction.

FIG. 1 shows a commercially-available radial magnetic bearing 1 in the form of a schematized cross-sectional view. The radial magnetic bearing 1 has a statically arranged stator 2. The stator 2 has a housing 3 and a stator element 4, which can consist for example of a filler material or of a number of metal sheets disposed behind one another in the axial direction X of the stator. The stator element 4 is magnetically-conducting and consists for example of a ferromagnetic material. The stator element 4 is disposed running around a rotor 5. The rotor 5 consists of a magnetically-conducting material such as a ferromagnetic material for example. The rotor 5 is rotationally fixed to a shaft 6. The shaft 6 can for example be a shaft of an electric motor or electric generator. The shaft 6 rotates in this case during operation of the electric motor or of the electric generator around the axis of rotation Z.

The radial magnetic bearing 1, on its side 12 of the stator element 4 facing towards the rotor 5, has recesses running in the axial direction X of the stator element 4, with only one recess 10 being labeled with a reference number in FIG. 1 for the sake of clarity. The recesses in this case are realized open on their side facing towards the rotor and thus in the shape of grooves. The recesses have a trapezoidal cross-section in such cases, as shown in the exemplary embodiment according to FIG. 1, which does not absolutely necessarily have to be the case. Electrical lines of coils run in the recesses, wherein, for the sake of clarity, only the lines 8a and 9a are provided with a reference number. The lines are disposed in the recesses. Teeth are formed by the recesses in the stator element 4, wherein, for reasons of clarity, only one tooth 18 is provided with a reference number. The coils in such cases are arranged around the teeth, wherein the current flows through the lines of the coils such that magnetic North pole N and magnetic South pole S are produced. The size of the teeth can be different in such cases, but this does not necessarily have to be the case, the teeth can also be the same size. Furthermore the number of teeth can differ from radial bearing to radial bearing.

In FIG. 2 the stator element 4 is shown with the coils running around the teeth in a simplified perspective view. For the sake of simplification in this case the number of recesses and thus the number of the teeth and coils are reduced and all teeth are shown as being identical in size. The same elements are provided in FIG. 2 with the same reference characters as in FIG. 1. For the sake of improved clarity only the two coils 8 and 9, as well as electric lines 8a and 9a of the coils 8 and 9 are provided with reference characters. The lines of the coils run in the recesses and around the teeth and thus form the teeth. The lines in such cases are usually present in the form of wrapping wires.

Returning to FIG. 1. Magnetic fields are created by the coils, which hold the rotor 5 suspended in an air gap 7 disposed between rotor 5 and stator 2. The coils are thus embodied for the creation of magnetic fields. To control the magnetic fields the radial magnetic bearing 1 has a control device 14, which activates, i.e. energizes, the coils accordingly to create the magnetic fields, this action being indicated by an arrow 15 in FIG. 1. The radial magnetic bearing 1 has sensors in such cases to detect the position of the rotor, which, for the sake of clarity, are not shown in FIG. 1 and which transfer to the control device 14 the position of the rotor in the air gap 7 for activation of the coils, this action being indicated in FIG. 1 by an arrow 16. The control device 14 contains regulation facilities for regulating the electrical currents passing through the coils. The radial magnetic bearing 1 is used for magnetic support of the rotor 5 and thus of the shaft 6 connected to the rotor 5 in the radial direction R. The radial magnetic bearing 1 is embodied for radial magnetic support of the rotor 5.

In commercially-available radial magnetic bearings the lines of the coils are disposed in such cases such that, in the recesses between the lines of the coils and the air gap 7 in each case, there remains a free space running in the axial direction X of the stator 2. For reasons of clarity only one free space 11 is labeled with a reference character in FIG. 1.

The rotor 5 generally consists of an electrically-conductive ferromagnetic material which experiences a force effect through the magnetic fields created by the stator. If the shaft 6 and thus the rotor 5 connected to the shaft are rotating in the air gap 7, the rotor 5 is subjected to a constant magnetic alternating field through the alternating magnetic poles N and S of the stator 2. Eddy currents are induced in the rotor 5 by this, which are undesired since they restrict the dynamics of the radial magnetic bearing and cause a thermal load to be imposed on the rotor. Since radial magnetic bearings are frequently used for applications in which the rotor is rotating at a high-speed, particular significance is attached to the reduction of the eddy currents in radial magnetic bearings.

In electrical engineering two measures are known in such cases for reducing eddy currents flowing in a rotor. A first option consists of reducing the number of magnetic poles of the stator. However this generally leads to a larger installation volume, so that a compromise must be found here between the smallest possible number of magnetic poles and a small installation volume. A further option consists of embodying the rotor from thin metal sheets which are isolated from one another.

Magnetic bearings for magnetic support of a rotor are known from U.S. Pat. No. 7,545,066 B2 and US 2010/0187926 A1.

SUMMARY OF THE INVENTION

The object of the invention, for a radial magnetic bearing, is to reduce the eddy currents occurring in the rotor.

This object is achieved by a radial magnetic bearing for magnetic support of a rotor, wherein the radial magnetic bearing has a stator, wherein the stator has a magnetically-conductive stator element running around the rotor, wherein the stator element, on its side facing towards the rotor, has recesses running in the axial direction of the stator element in which electrical lines of coils are disposed, wherein magnetic fields are able to be generated by the coils, which hold the rotor suspended in an air gap disposed between rotor and stator, wherein the lines are disposed in the recesses such that a free space remains in the recesses between the lines and the air gap, wherein a magnetically-conductive filler element is disposed in the free space.

This object is further achieved by a radial magnetic bearing for magnetic support of a rotor, wherein the radial magnetic bearing has a stator, wherein the stator has a magnetically-conducting stator element disposed running around the rotor, whereby the stator element has recesses on its side facing towards the rotor in the axial direction of the stator element in which electric lines of coils are disposed, wherein magnetic fields are able to be created by the coils which hold the rotor suspended in an air gap disposed between rotor and stator, wherein the lines are disposed in the recesses such that, in the recesses the lines terminate flush with the side of the stator element facing towards the rotor, wherein on the side of the stator element facing towards the rotor a magnetically-conductive ring running around the rotor is disposed, wherein the air gap is disposed between ring and rotor.

This object is further achieved by a radial magnetic bearing for magnetic support of a rotor, wherein the radial magnetic bearing has a stator, wherein the stator has a magnetically-conductive stator element disposed running around the rotor, wherein the stator element has recesses running in the axial direction of the stator element in which electrical lines of coils are disposed, wherein the recesses are surrounded by the stator element in the axial direction of the stator element, wherein magnetic fields are able to be generated by the coils which hold the rotor suspended in an air gap disposed between rotor and stator.

It has proven to be advantageous for the filler element to be able to be pushed into the free space in the axial direction of the stator, since the filler element can then be introduced into the free space in an especially simple manner.

BRIEF DESCRIPTION OF THE DRAWING

Exemplary embodiments of the invention are shown in the drawing and explained in greater detail below. The figures are as follows.

DETAILED DESCRIPTION OF PREFERRED EMBODIMENTS

Figure 1:
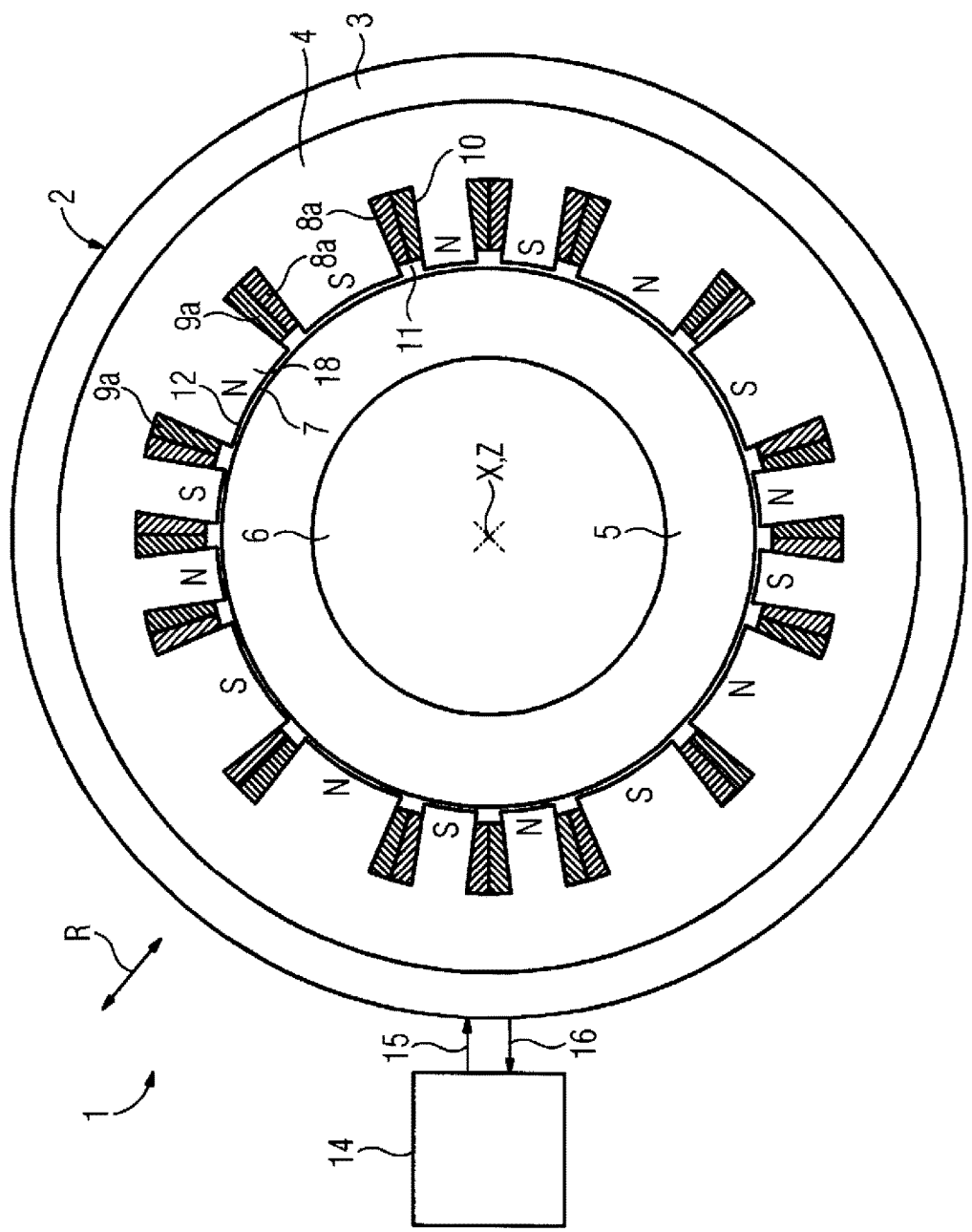
FIG. 1 shows the schematicized cross-sectional view of a known commercially-available radial magnetic bearing.

The same elements are labeled with the same reference characters in the figures.

With known commercially-available radial magnetic bearings, as already stated, the lines of the coils are disposed in the recesses of the stator element such that a free space remains in the recesses between the lines and the air gap. Such a free space running in the axial direction X of the stator 2 is labeled in FIG. 1 with the reference number 11. The coils are thus not flush with the side 12 of the stator element 4 facing towards the rotor, i.e. not flush with the pole heads of the magnetic North and South poles N and S. A free space 11 remains in each recess.

Figure 2:
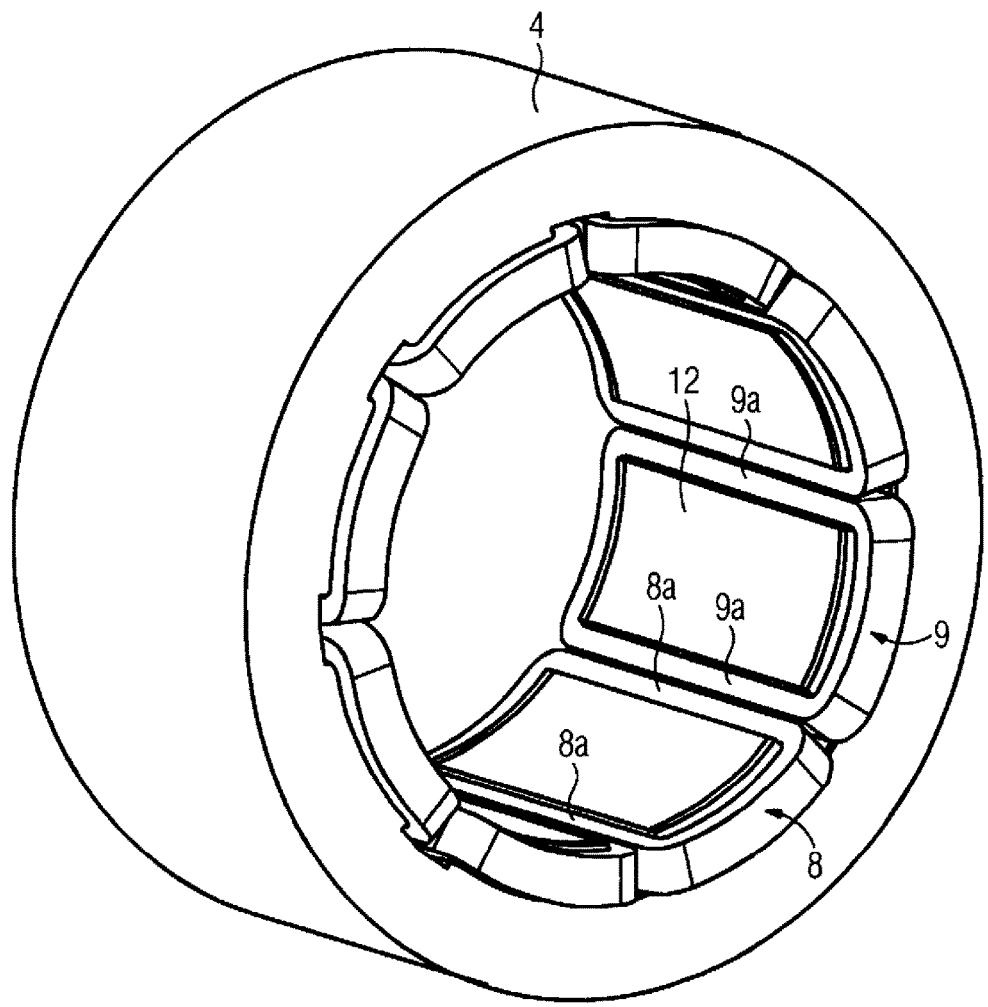
FIG. 2 shows a stator element of a known commercially-available radial magnetic bearing provided with coils in the form of a simplified perspective diagram.
Figure 3:
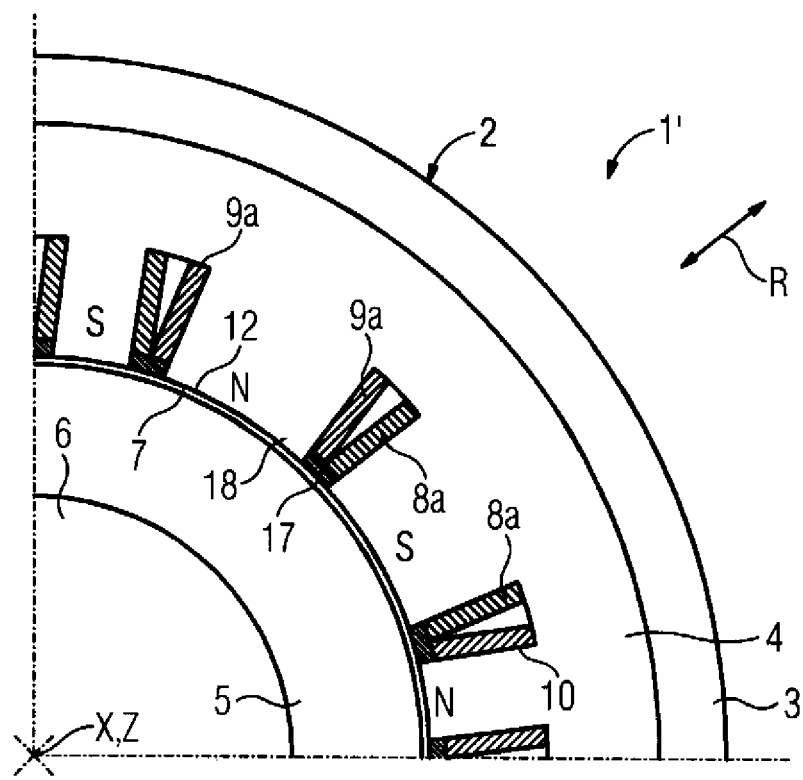
FIG. 3 shows a first embodiment of the inventive radial magnetic bearing.

FIG. 3 shows a first embodiment of an inventive radial magnetic bearing 1' in the form of a schematicized diagram. The layout and the function of the inventive magnetic bearing 1' in this case matches that of the known commercially-available radial magnetic bearing 1 in accordance with FIG. 1 and FIG. 2. The same elements are labeled in FIG. 3 with the same reference characters as in FIG. 1 and FIG. 2. An enlarged section of FIG. 1 is shown in FIG. 3. In accordance with the invention a magnetically-conductive filler element 17 running in the axial direction X of the stator 2 is disposed in the respective free space, wherein, for the sake of clarity, only one filler element 17 is provided with a reference character in FIG. 3.

Figure 4:
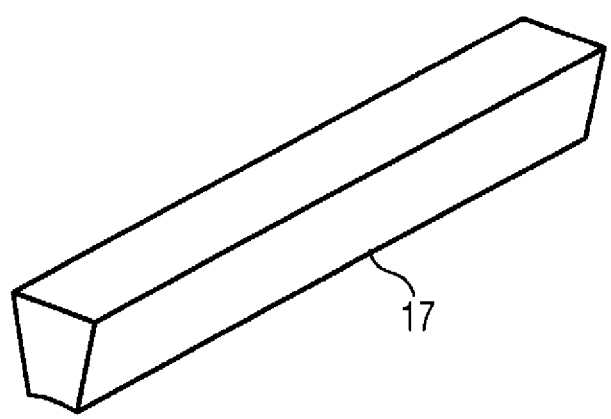
FIG. 4 shows a filler element.

The filler element 17 is shown in a perspective view in FIG. 4. The filler element consists of a magnetically-conductive material, such as a ferromagnetic material for example (e.g. iron) and can for example consist of the same material as the material of the stator element 4. The filler element is preferably flush with the lines of the coils disposed in the recesses. Furthermore the filler element preferably makes a flush connection with the side 12 of the stator element 4 facing towards the rotor, so that the width of the air gap 7 remains constant over the entire inner circumference of the stator element 4.

The filler element is preferably able to be inserted into the free space in the axial direction X of the stator, so that even after the installation of the coils into the stator element 4, it can be introduced in a simple manner. The filler element is preferably thus embodied in the form of a slider. A magnetic groove seal of the recesses embodied as grooves is realized with the filler element. Through the magnetic groove seal realized by means of the filler element the course of a magnetic field is changed in air gap 7. Through the magnetic groove seal a softer course of the components of the magnetic flux density running in the radial direction from one magnetic poles the next magnetic pole is achieved, which results in a reduction of the eddy currents induced in the rotor.

Figure 5:
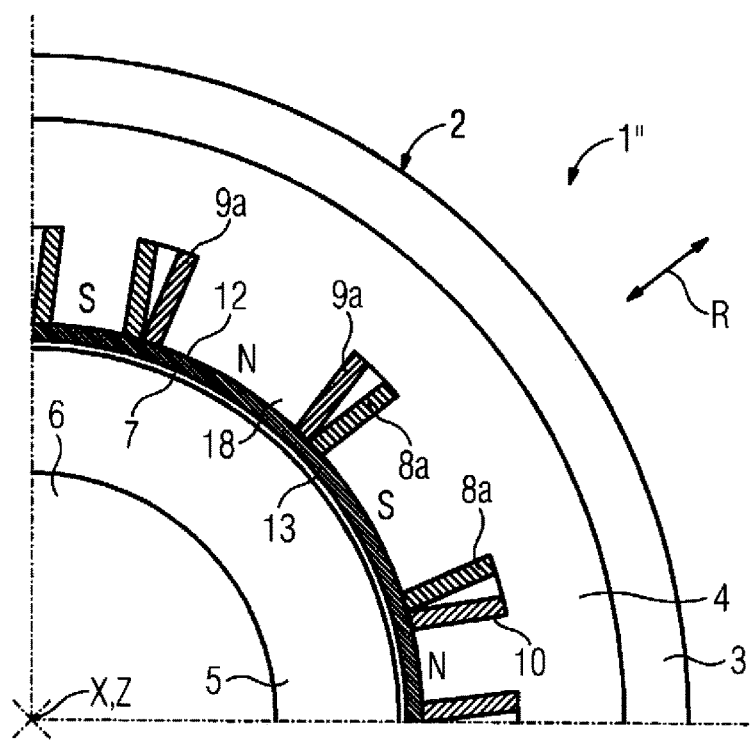
FIG. 5 shows a second embodiment of the inventive radial magnetic bearing.

A further embodiment of the inventive radial magnetic bearing 1" is shown in FIG. 5 in the form of a schematic diagram. The essential structure and the function of the inventive radial magnetic bearing 1" here matches that of the known, commercially-available radial magnetic bearing 1 in accordance with FIG. 1 and FIG. 2. The same elements are labeled in FIG. 5 with the same reference characters as in FIG. 1 and FIG. 2. Essentially an enlarged section of FIG. 1 is shown in FIG. 5. In the embodiment of the inventive radial magnetic bearing 1" in accordance with FIG. 5, unlike in the known commercially-available radial magnetic bearing 1 in accordance with FIG. 1, the recesses are flush with the side 12 of the stator element 4 facing towards the rotor 5, i.e. flush with the pole heads of the magnetic North and South pole N and S. The magnetic groove seal is achieved in this embodiment of the invention by a magnetically-conductive ring 13. The magnetically-conductive ring 13 is disposed on the side 12 of the stator element 4 facing towards the rotor 5, wherein the air gap 7 is disposed between ring 13 and rotor 5. The ring 13 is a component of the stator 2. The ring 13 can in this case for example consist of a ferromagnetic material such as e.g. iron and for example consist of the same material as the stator element 4. Through the ring a softer course of the components of the magnetic flux density running in the radial direction from one magnetic pole the next magnetic pole is achieved, which results in a reduction of the eddy currents induced in the rotor.

Figure 6:
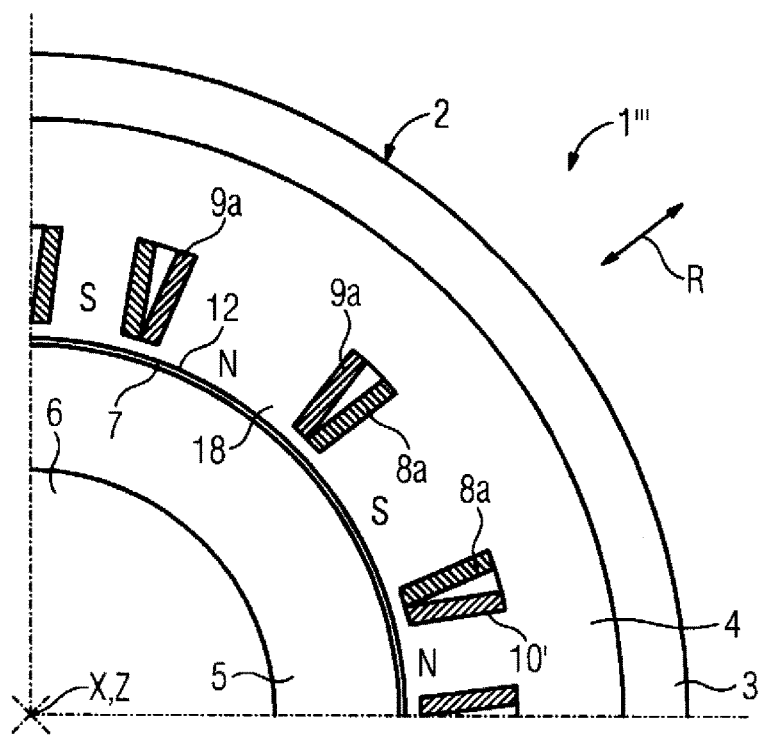
FIG. 6 shows a third embodiment of the inventive radial magnetic bearing.

A further embodiment of an inventive radial magnetic bearing 1''' is shown in FIG. 6 in the form of a schematic diagram. The essential structure and the function of the inventive radial magnetic bearing 1''' here match that of the known, commercially-available radial magnetic bearing 1 in accordance with FIG. 1 and FIG. 2. The same elements are labeled in FIG. 6 with the same reference characters as in FIG. 1 and FIG. 2. FIG. 6 essentially shows an enlarged section of FIG. 1. In the embodiment of the inventive radial magnetic bearing 1''' in accordance with FIG. 6, by contrast with the known commercially-available radial magnetic bearing 1 in accordance with FIG. 1, the recesses are no longer open in the direction of the rotor and thus realized in the form of grooves, but the recesses are surrounded in the axial direction X of the stator element 4 by material of the stator element 4. For reasons of clarity only one such recess 10' is labeled with a reference character in FIG. 6. Through this a softer course of the components of the magnetic flux density running in the radial direction from one magnetic pole the next magnetic pole is achieved, which results in a reduction of the eddy currents induced in the rotor.

It should be noted at this point that the rotor 5 can also be an integral component of the shaft 6 and thus the shaft 6 together with the rotor 5 can be embodied as a one-piece element. The rotor is then present in the form of the shaft. The external diameter of the shaft 6 in this case, at the point at which the inventive radial magnetic bearing is disposed, is only slightly smaller than the internal diameter of the stator of the radial magnetic bearing, so that only an air gap is present between stator and shaft.

What is claimed is:

1. A radial magnetic bearing for magnetic support of a rotor, said radial magnetic bearing constructed in the form of a heteropolar bearing and comprising:
   a rotor;
   a stator having a magnetically-conductive stator element which is arranged in surrounding relationship to the rotor, said stator element having a side facing towards the rotor and having recesses running in an axial direction of the stator element, said recesses having a trapezoidal cross-section;
   coils generating magnetic fields to hold the rotor suspended in an air gap disposed between the rotor and the stator, said coils having electrical lines disposed in the recesses such that a free space remains in the recesses between the electrical lines and the air gap; and
   a magnetically-conductive filler element disposed in the free space, wherein the filler element is made up by s ferromagnetic element, said ferromagnetic element being iron and the filler element is configured for placement into the free space in the axial direction of the stator element, with the electrical lines terminating flush with the magnetically-conductive filler element and with the magnetically-conductive filler element terminating flush with the rotor-facing side of the stator element.

2. A radial magnetic bearing for magnetic support of a rotor, said radial magnetic bearing constructed in the form of a heteropolar bearing and comprising:
   a rotor;
   a stator having a magnetically-conductive stator element which is arranged in surrounding relationship to the rotor, said stator element having a side facing towards the rotor and having recesses running in an axial direction of the stator element, said recesses having a trapezoidal cross-section;
   coils generating magnetic fields to hold the rotor suspended in an air gap disposed between the rotor and the stator, said coils having electrical lines disposed in the recesses such that the electrical lines in the recesses terminate flush with the rotor-facing side of the stator element; and
   a magnetically-conductive ring disposed in surrounding relationship to the rotor on the rotor-facing side of the stator element, said air gap being disposed between the ring and the rotor.

3. A radial magnetic bearing for magnetic support of a rotor, said radial magnetic bearing constructed in the form of a heteropolar bearing and comprising:
   a rotor;
   a stator having a magnetically-conductive stator element which is arranged in surrounding relationship to the rotor, said stator element having a side facing towards the rotor and having recesses running in an axial direction of the stator element and being enclosed by the stator element in the axial direction of the stator element; and
   coils having electrical lines disposed in the recesses such that electrical lines in the recesses terminate flush with the rotor-facing side of the stator element, said coils generating magnetic fields to hold the rotor suspended in an air gap disposed between the rotor and the stator.

* * * * *